(12) United States Patent
Meinds (10) Patent No.: US 8,963,942 B2
(45) Date of Patent: Feb. 24, 2015

(54) PROGRAMMABLE PROCESSOR

(75) Inventor: Kornelis Meinds, Woalre (NL)

(73) Assignee: Intel Corporation, Santa Clara, CA (US)

( * ) Notice: Subject to any disclaimer, the term of this patent is extended or adjusted under 35 U.S.C. 154(b) by 2364 days.

(21) Appl. No.: 11/720,622

(22) PCT Filed: Dec. 1, 2005

(86) PCT No.: PCT/IB2005/053995
§ 371 (c)(1),
(2), (4) Date: Sep. 18, 2009

(87) PCT Pub. No.: WO2006/059301
PCT Pub. Date: Jun. 8, 2006

(65) Prior Publication Data
US 2010/0017449 A1    Jan. 21, 2010

(30) Foreign Application Priority Data
Dec. 3, 2004 (EP) .................................. 04106277

(51) Int. Cl.
*G09G 5/00* (2006.01)
*G06T 11/00* (2006.01)
*G06T 15/04* (2011.01)

(52) U.S. Cl.
CPC ............... *G06T 11/001* (2013.01); *G06T 15/04* (2013.01)
USPC ........... 345/582; 345/581; 345/583; 345/502; 345/506

(58) Field of Classification Search
CPC ......... G06T 15/005; G06T 1/20; G06T 15/04; G09G 5/363; G09G 5/393
USPC ........................... 345/581, 582, 583, 502, 506
See application file for complete search history.

(56) References Cited

U.S. PATENT DOCUMENTS

| | | | | |
|---|---|---|---|---|
| 4,908,874 A | * | 3/1990 | Gabriel | 382/277 |
| 5,202,670 A | * | 4/1993 | Oha | 345/671 |
| 5,469,274 A | * | 11/1995 | Iwasaki et al. | 358/450 |
| 5,719,600 A | * | 2/1998 | Alcorn | 345/587 |
| 5,861,874 A | * | 1/1999 | Joto | 345/173 |
| 6,029,204 A | * | 2/2000 | Arimilli et al. | 709/248 |

(Continued)

FOREIGN PATENT DOCUMENTS

| | | |
|---|---|---|
| DE | 3929115 A1 | 3/1991 |
| DE | 4418856 A1 | 12/1995 |

(Continued)

OTHER PUBLICATIONS

Meinds et al: "Resample Hardware for 3D Graphics"; Proceedings of Graphics Hardware 2002, pp. 17-26, 2002.

*Primary Examiner* — Xiao M. Wu
*Assistant Examiner* — Todd Buttram
(74) *Attorney, Agent, or Firm* — Leydig, Voit & Mayer, Ltd.

(57) ABSTRACT

A digital signal processor 1 is provided for performing digital image processing operations such as forward texture mapping. A first logic unit 21 receives input sample coordinates xr and xl, and determines a first color weight value "w" and a second color weight value "wN". A second logic unit 23 weights an input sample color with the color weight value wN, with the resultant weighted sample color being added to accumulated weighted sample colors from one or more previous iterations, thereby producing a new accumulated weighted sample color, ie the rgbaPartOut signal 13. A third logic unit 25 is configured to weight the input sample color with the first color weight value w, with the resultant weighted sample color being added to the accumulated weighted sample colors rgbaPartIn to produce the output color signal rgbaOut 11. The logic unit 21 produces the output sample coordinate xOut that relates to the integer coordinate where the color value of output sample rgbaOut 11 is meant for, and also generates a genPix signal that indicates when the output sample is valid. The operation described above continues for all iterations of input sample colors that contribute to a single output sample.

31 Claims, 4 Drawing Sheets

(56) References Cited

U.S. PATENT DOCUMENTS

| | | | |
|---|---|---|---|
| 7,266,255 B1 * | 9/2007 | Wasserman et al. | 382/307 |
| 7,710,427 B1 * | 5/2010 | Hutchins et al. | 345/561 |
| 2004/0174368 A1 * | 9/2004 | Schimpf et al. | 345/501 |

FOREIGN PATENT DOCUMENTS

| | | |
|---|---|---|
| DE | 19635220 A1 | 5/1998 |
| DE | 10060573 A1 | 9/2001 |
| DE | 10042698 A1 | 3/2002 |
| DE | 10217664 A1 | 11/2003 |
| EP | 0548917 A1 | 6/1993 |
| JP | 59141742 A | 8/1984 |
| JP | 10049658 A | 2/1998 |
| JP | 10134176 A | 5/1998 |
| JP | 2001160140 A | 6/2001 |

* cited by examiner

PROGRAMMABLE PROCESSOR

FIELD OF THE INVENTION

The invention relates to a programmable processor, and in particular, to a digital signal processor for sample rate conversion on a programmable processor. The invention also relates to a method of resampling a digital signal.

BACKGROUND

Programmable processors operate according to a sequence of operations taken from a set of operations known as an instruction set. A program is usually written in a higher level source code, such as C, which is used to define the sequence of operations that are to be executed by the programmable processor. In other words, rather than writing the sequence of operations directly using operations from the instruction set, the high level language provides a more user friendly method of programming, which is then compiled into a set of executable operations taken from the instruction set.

The mapping between the high level source code and the instruction set does not have to be one-on-one. For example, an operation in the source code can be mapped onto several executable operations. Also, several operations in the source code can be mapped onto a single executable operation.

Programmable processors are widely used in digital signal processing, including image processing and 3D graphics. One operation that is carried during image processing is texture mapping, which involves a process known as resampling. Resampling is the process of minification (decimation) and magnification (interpolation), for example where a digital image is resampled to a different resolution.

Most texture mapping hardware is based on the principles of inverse texture mapping, whereby a prefilter of a pixel (in screen space) is mapped onto input samples (texels). While inverse texture mapping has the advantage of being simple to implement in hardware, it suffers from the disadvantages of either having poor quality (such as aliasing or blurry artefacts) or that the filters become very complicated.

An alternative to inverse texture mapping is forward texture mapping, whereby texels are mapped to screen space. A known circuit for performing forward texture mapping is described in "Resample hardware for 3D graphics", Meinds & Barenbrug, Proceedings of Graphics Hardware 2002, pages 17-26, 2002. However, known methods of forward texture mapping such as this do not provide efficient image processing or use fully dedicated hardware.

The aim of the present invention is to provide a programmable processor and a new digital signal processing operation for performing digital resampling more efficiently on a programmable processor by performing a dedicated operation rather than executing separate (finer granularity) operations as carried out on a conventional programmable processor. More specifically, the present invention is concerned with a digital image processor for use with forward texture mapping.

SUMMARY OF THE INVENTION

According to a first aspect of the invention there is provided a programmable processor for processing one or more input sample values of a digital signal to produce an output signal, the processor comprising:
a first logic unit adapted to generate first and second weight values (w, wN);
a second logic unit adapted to receive an input sample value (rgbaIn) and the second weight value (wN), and to weight the input sample value (rgbaIn) with the second weight value (wN) to produce a weighted sample value, and further adapted to add the weighted sample value to one or more previously generated weighted sample values to generate an accumulated weighted sample value (rgbaPartOut);
a third logic unit adapted to receive the input sample value (rgbaIn) and the first weight value (w), and to generate an output sample (rgbaOut) based on the input sample value (rgbaIn), the first weight value (w) and the accumulated weighted sample value (rgbaPartOut) output from the second logic unit.

According to another aspect of the invention, there is provided a method of performing a digital signal processing operation in which one or more input sample values of a digital signal are processed to produce an output signal, the method comprising the steps of:
generating first and second weight values (w, wN);
weighting an input sample value (rgbaIn) with the second weight value (wN) to produce a weighted sample value, and adding the weighted sample value to one or more previously generated weighted sample values to generate an accumulated weighted sample value (rgbaPartOut); and
generating an output sample (rgbaOut) based on the input sample value (rgbaIn), the first weight value (w) and the accumulated weighted sample value (rgbaPartOut).

BRIEF DESCRIPTION OF THE DRAWINGS

For a better understanding of the invention, and to show more clearly how it may be carried into effect, reference will now be made, by way of example only, to the following drawings in which.

DETAILED DESCRIPTION OF A PREFERRED EMBODIMENT OF THE INVENTION

It is noted that the preferred embodiment is being described in relation to performing a digital image resampling function called texture mapping in a 3D graphics pipeline. However, it will be appreciated that the invention can also be used for other digital image or digital signal processing operations, including down scaling of video signals, such as down scaling from a camera to a display of a mobile phone. Also, the invention is very suitable for use in warping of digital images or other forms of non-uniform resampling.

Prior to discussing the digital signal processor and resample operation of the present invention in greater detail, a brief explanation will first be given about the resampling process. The perspective transformation of a texture map is a two dimensional resampling process, ie the transformation maps a sampled input image (the texture map) onto a sampled output image (the screen). The ideal resampling process consists of four steps:
1. Using a reconstruction filter to construct a continuous signal from the discrete input;
2. Transforming the reconstructed input signal;
3. Prefiltering the transformed signal to bandlimit the signal to half the output sample rate;

4. Sampling the filtered signal to produce the discrete output.

Most of the texture mapping in a typical 3D scene results in minification (ie the number of output samples is smaller than the number of input samples). In such cases, the prefilter that attenuates high frequencies caused by minification has more influence on the quality of the resulting image than the reconstructing filter. Therefore, for minification, a high quality prefilter is desired whereas the construction filter is less important.

In the case of magnification, however, the reconstruction filter dominates the prefilter. Minification is the more critical case because it can generate high frequencies that can give rise to undesired aliasing artefacts.

According to the invention, a digital signal processor and a new digital signal resampling operation is provided for processing images and 3D graphics. The digital image processor can be used for down-scaling (i.e. minification, decimation or down-sampling) a digital image with a stepless variable scale factor (across the image). In other words, the scale factor can be every rational value below 1, however the real accuracy is determined by the fractional precision of the texel (input sample) coordinates, as will be described later in the application.

Figure 1:
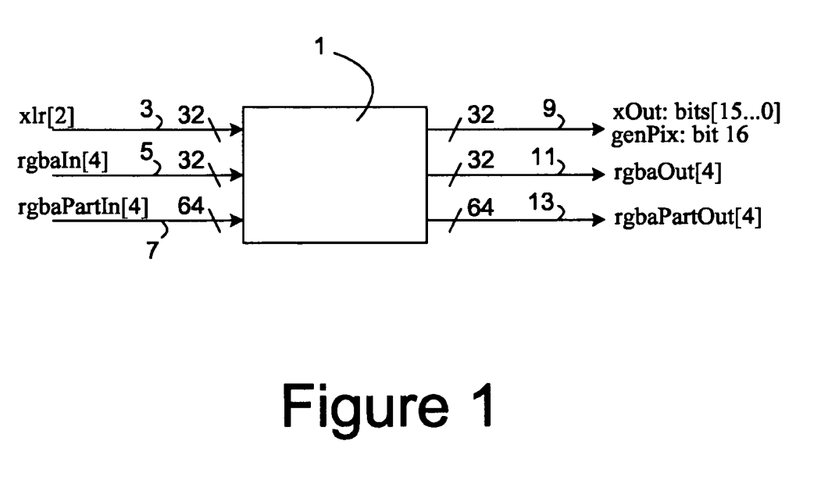
FIG. 1 shows a high level view of a digital signal resample operation of the present invention.

FIG. 1 shows a high level view of the resample operation 1 according to the present invention, together with the input and output connections required for performing the digital image processing operation of the present invention. The resample operation 1 is described using four colour channels: r,g,b and a. However, it will be appreciated that it is also possible to apply the invention to variants with less or more colour channels. Also the preferred embodiment uses 8 bits per colour channel. Again, it will be appreciated that any other number of bits per colour channel could be used without departing from the scope of the invention as defined in the claims.

The resample operation 1 is connected to receive input signals comprising a "xlr" signal 3, a "rgbaIn" signal 5 and a "rgbaPartIn" signal 7. In the described embodiment, the xlr signal 3 comprises two sets of 16 bits called xr and xl, respectively. The xr and xl signals are inputs, being the coordinates of a current and previous input sample, respectively. The rgbaIn signal 5 relates to the input sample colour, and comprises 4 colour channels (ie r, g, b, a) each having 8 bits, thus comprising 32 bits in total. The rgbaPartIn signal 7 comprises 4 signals, each having 16 bits, thereby comprising 64 bits in total.

According to the preferred embodiment, the resample operation 1 produces output signals comprising a bundled "xOut/genPix" signal 9, a "rgbaOut" signal 11 and a "rgbaPartOut" signal 13. The rgbaOut signal 11 contains 4 colour channels each having 8 bits, thus providing a 32 bit output signal. The rgbaPartOut signal 13 comprises 4 signals each having 16 bits, thereby providing a 64 bit output signal. The xOut/genPix signal 9 comprises an xOut signal, for example assigned to bits [15..0], and a genPix signal assigned to bit 16. In the example, bits [31..17] of signal 9 are unused. The function of each of these signals will be described in greater detail in relation to the other figures.

It is noted that, instead of bundling these ports such that they fit 32 bits or 64 bits, they could also be connected separately or bundled differently. The xOut signal relates to the integer coordinate where the colour value of the output signal rgbaOut 11 is meant for. The xOut signal and output signal rgbaOut are only meaningful when the genPix signal 9 is true, indicating that the last input sample that contributes to this output pixel has been processed. In other words, the genPix signal 9 is outputted to inform the higher level software whether or not the rgbaOut value 11 is valid (ie indicating if the rgbaOut value 11 is to be processed further or to be neglected).

It is noted that the rgbaPartOut signal 13 and rgbaPartIn signal 7 relate to the same (64 bit) register. The colours of the input samples that contribute to a single output sample are weighted and then accumulated in this register, thus making the register an accumulation register. The precision must be high to allow larger minification factors where a large number, say one hundred, input samples each make a small contribution towards the output sample. Each of the small contributions would be rounded to zero in the case where precision was say 8 bits instead of 16 bits.

Figure 2:
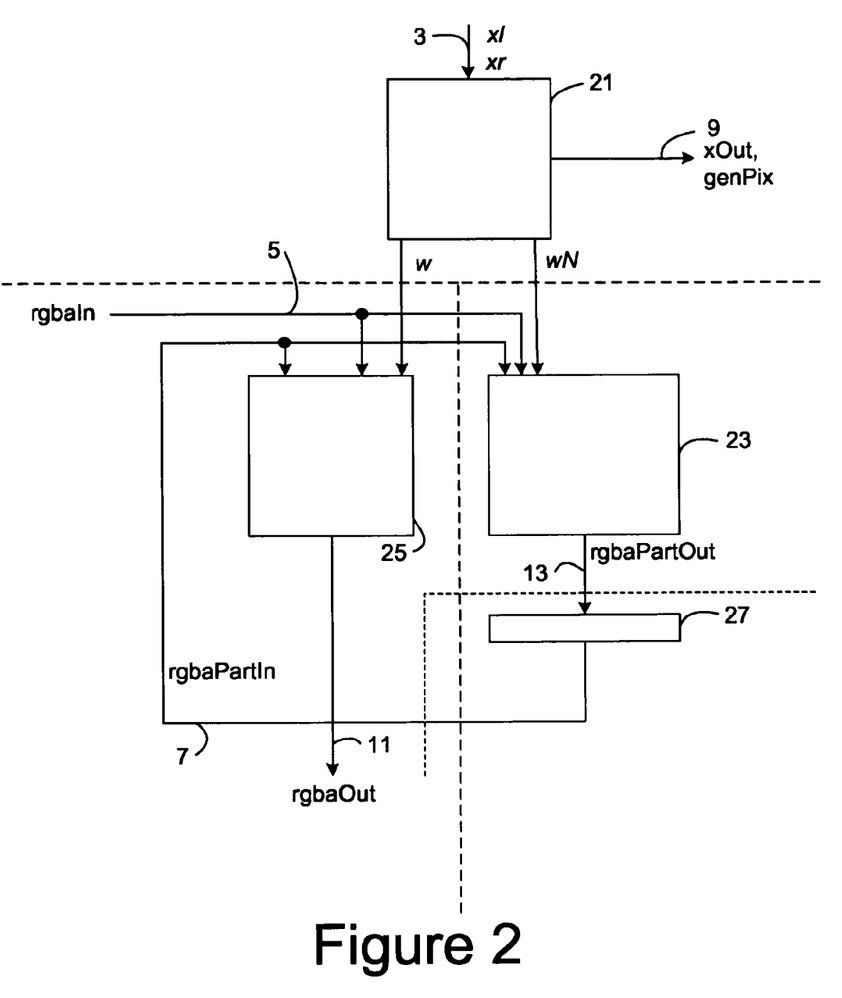
FIG. 2 shows a block diagram illustrating the resample operation of FIG. 1 in greater detail.

FIG. 2 shows a block diagram illustrating the operation of the resample operation 1 of FIG. 1 in greater detail. The resample operation comprises a first logic unit 21 for receiving the input sample coordinates in the form of the xr and xl signals, ie the coordinates for the current and previous sample, respectively. The logic unit 21 is configured to determine the colour weights of the input samples, and to output a first colour weight value "w" and a second colour weight value "wN". The first colour weight value w is the weight derived from phase r, while the second colour weight value wN is the weight derived from phase 1. The logic unit 21 also produces the output sample coordinate, ie the xOut signal 9 that relates to the integer coordinate where the colour value of output signal rgbaOut 11 is meant for. Also, the logic unit 21 is configured to generate the genPix signal 9 that indicates whether or not the output sample is valid.

A second logic unit 23 receives the second colour weight value wN relating to phase 1 and the input sample colour, ie the rgbaIn signal 5, and is configured to weight the input sample colour with the colour weight value wN. The resultant weighted sample colour is added to the rgbaPartIn signal 7, (which corresponds to the accumulated weighted sample colours from one or more previous iterations or passes). The second logic unit 23 produces a new accumulated weighted sample colour, ie the rgbaPartOut signal 13, that is stored in a register 27. In the preferred embodiment, since each colour is represented by 16 bits, the register 27 comprises 64 bits. Preferably, the 64 bit register 27 is part of a register file of the main processor, as shown by the dotted lines. However, it will be appreciated that the 64 bit register 27 could also be incorporated into the hardware of the resample operation 1. As mentioned earlier, the 64 bit register 27 is shared between the rgbaPartOut signal 13 and the rgbaPartIn signal 7. In other words, the accumulated weighted sample colour signal, ie the rgbaPartOut signal 13, of one iteration or pass forms the rgbaPartIn signal 7 of a subsequent iteration or pass.

A third logic unit 25 receives the first colour weight value w and the input sample colour, ie the rgbaIn signal 5, and is configured to weight the input sample colour with the first colour weight value w. The resultant weighted sample colour is added to the rgbaPartIn signal 7, ie corresponding to the accumulated weighted sample colours received from the 64 bit register 27, to produce the output colour signal rgbaOut 11. In the present example, the output colour signal is rounded to a lower precision format such as RGBA8888, thereby giving the 32 bits shown in FIG. 1.

The operation described above continues for all iterations of input sample colours that contribute to a single output sample. When the first logic unit 21 determines that the processing has been completed for a particular pixel, the genPix signal 9 is asserted to show that the value on rgbaOut 11 is valid.

The resample operation 1 described above is a dedicated signal processing operation that can be performed more efficiently than carrying out the same tasks using known instruction sets.

Figure 3:
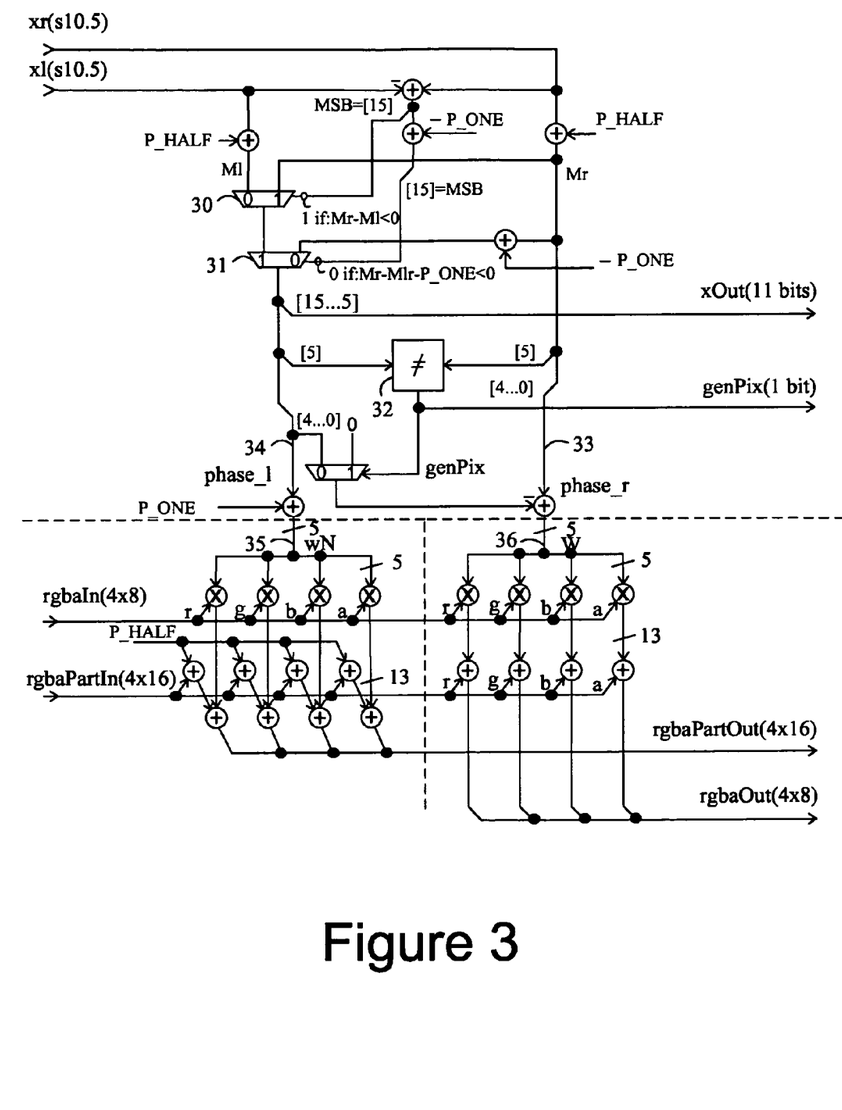
FIG. 3 shows a circuit diagram illustrating how the digital signal resample operation of FIGS. 1 and 2 may be implemented in hardware.

FIG. 3 shows in greater detail an exemplary circuit for realising the resample operation 1 shown in FIGS. 1 and 2. The dotted lines have been added to clarify how each section of the circuit corresponds to the block diagram shown in FIG. 2. It is noted that the circuit of FIG. 3 can be implemented with a 1-cycle throughput and a 2 or 3 cycle latency. It is noted that, in the 2-cycle latency case, the rgbaIn and rgbaPartIn can be fetched one cycle later than the coordinates xlr such that 1-cycle throughput can be achieved.

Multiplexers 30 and 31, together with their associated connections, are provided to prevent decreasing coordinates and magnification. In particular, the multiplexer and associated connections prevent Ml from being bigger than Mr, as will be described later. The multiplexer 31 and associated connections prevent Ml from being more than 1 smaller than Mr, again as will be described later. An XOR operation 32 is performed on bit 5 of Ml and Mr to generate the genPix signal that indicates if the xOut and rgbaOut signals are ready. The signal at point 33 is the fractional part of Mr, while the signal at point 34 is the fractional part of Ml. The weighted signal wN at point 35 is the weight derived from phase 1, and is used to weight the input sample colours (rgbaIn) and add the weighted signal to the rgbaPartIn signal. The result is then output on rgbaPartOut. The weighted signal w at point 36 is the weight derived from phase r, and is used to weight the input sample colour, which is then added to rgbaPartIn and then (after decreasing accuracy) output as the rgbaOut signal.

The circuit described above acts as a dedicated digital resample operation for processing digital signal tasks such as forward texture mapping.

In order to explain the resample operation further, the semantic of the resample operation is described in the C-function shown in the code of Table 1 below, using the following definitions:

```
typedef unsigned char        uns8;
typedef unsigned short       uns16;
typedef unsigned int         uns32;
typedef unsigned long long        uns64;
typedef int                       bool;
#define C 4              // number of color channels, C equals 4
typedef short       fixP;     // s10.5 fixed point type for coordinates
#define FPP 5       // fixed point precision behind the dot
#define P_ONE            (fixP)    ( 1 << FPP      )
#define P_HALF           (fixP)    ( 1 << (FPP-1)  )
#define P_FRAC_MASK      (fixP)    ( P_ONE-1       )
```

It is noted that the C and FPP definitions might be chosen differently.

Table 1—Below

```
1      void splatbox (uns16 xlr[2], uns8 rgbaIn[C], uns16 rgbaPartIn[C], // inputs
2                uns32 *xOut, uns8 rgbaOut[C], uns16 rgbaPartOut[C])// outputs
3      {
4      // internal variables:
5      int c;               // color channel number 3..0
6      fixP phase_l, phase_r;
7      bool genPix;
8      uns8 w, wN;          // weights (only 5 bits needed)
9
10     fixP Ml = xlr[1] + P_HALF;
11     fixP Mr = xlr[0] + P_HALF;
12
13         if ( Mr-Ml < 0 ) Ml = Mr;        // to prevent decreasing coordinates
14         if ( Mr-Ml > P_ONE) Ml = Mr-P_ONE // to prevent magnification
15
16         genPix = (P_ONE & Mr) != (P_ONE & Ml);
17         *xOut = (genPix<<16) | ( (Ml>>FPP) & 0xffff);
18         // xOut contains genPix boolean at [16]; bits [15..0] contains signed integer part of x coordinate
19
20         phase_r = Mr & P_FRAC_MASK;
21         phase_l = Ml & P_FRAC_MASK;
22
23         // Next 2 lines execution only needed if genPix==1 (it doesn't harm to do it always)
24         wN = P_ONE - phase_l;
25         for (c=0; c<C; c++) rgbaOut[c] = ( rgbaPartIn[c] + wN * rgbaIn[c] + P_HALF) >> FPP;
26
27         w = phase_r-( genPix ? 0 : phase_l);
28         for (c=0; c<C; c++) rgbaPartOut[c] = ( genPix ? 0 : rgbaPartIn[c] ) + w * rgbaIn[c];
29         }
```

It is noted that lines 13 and 14 of the above code relate to two test conditions performed by the resample operation. These test are preferably inserted to avoid "illegal" situations. The program code using the digital image processing of the present invention should not drive the processor with decreasing coordinates (Mr<Ml) or in magnification mode (Mr−Ml>1). However, sometimes it is difficult to avoid decreasing coordinates for corner cases, such as perspective projected near oblique polygons. Thus, it is much simpler to test for this case for every sample, rather than have to provide difficult code to avoid the corner case. Similar for magnification, within a span of a triangle, normally it is rather easy to ensure minification (Mr−Ml<1) by changing the mip-map level. However, for example, in a second pass vertical resampling, in a corner case, the samples of an intermediate vertical span might contain some gaps if it is close to a near vertical edge (of a polygon) that has been produced by multiple first pass horizontal resampling passes. It is noted that the tests provided by these two lines of code correspond to the functions provided by multiplexers 30 and 31 in FIG. 3.

Figure 4:
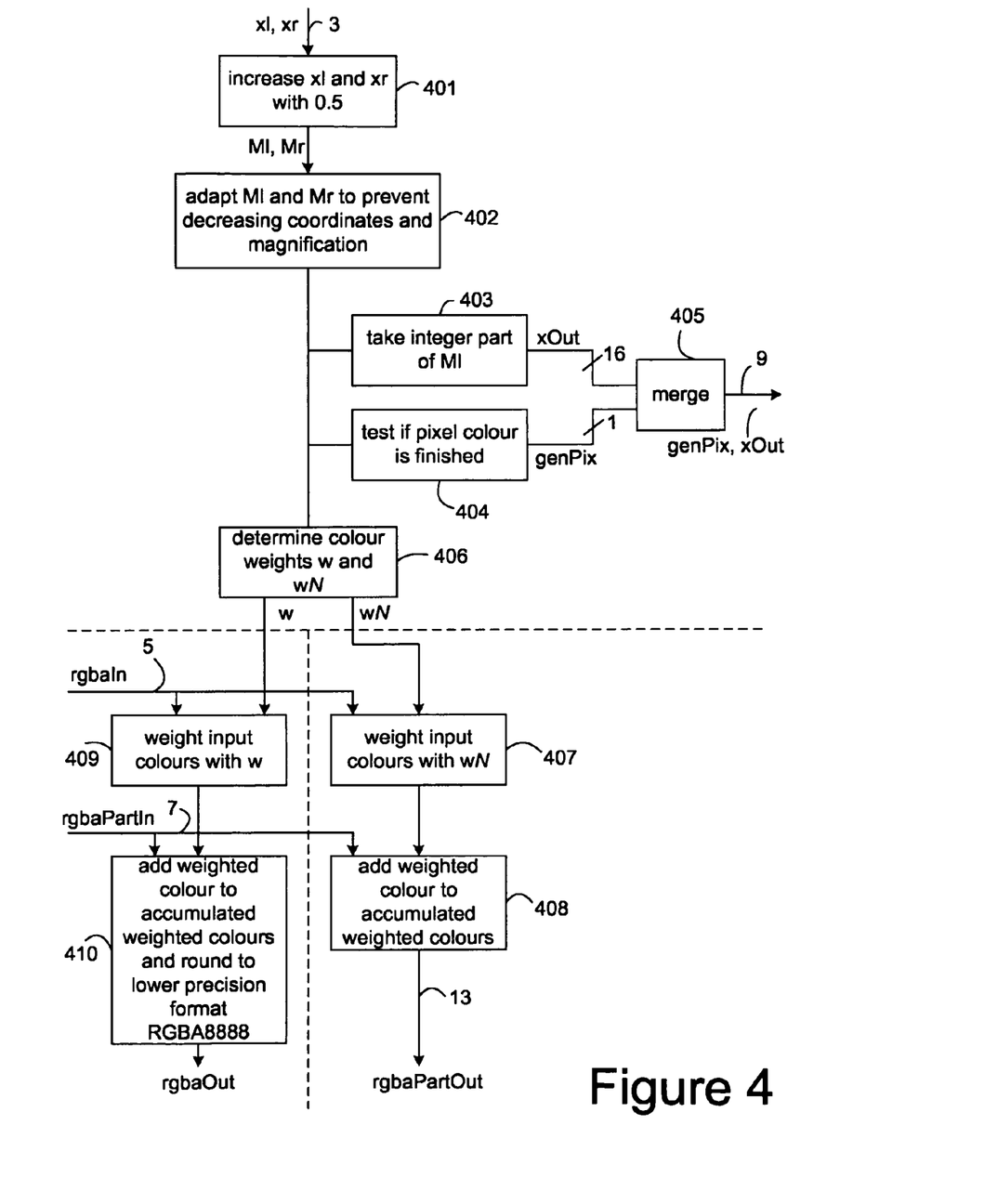
FIG. 4 shows a flow diagram describing the operation of FIGS. 1 to 3.

FIG. 4 illustrates a flow diagram for describing the operation of the code shown in Table 1 above. In step 401 the input sample coordinates xr and xl corresponding to the current and previous samples are received, and increased by 0.5 to produce the signals Mr and Ml. The signals Mr and Ml indicate the right and left border of the reconstruction footprint belonging to the current input sample. This function is performed by lines 10 and 11 in the code shown in Table 1

In step 402 the Mr and Ml signals are adapted to prevent decreasing coordinates and magnification. This function is performed by lines 13 and 14 in the code shown in Table 1, and is equivalent to the operation performed by the multiplexers 30 and 31 of FIG. 3.

In step 403, the integer part of Ml is determined, and forms the xOut signal that indicates the output sample coordinate. This function is performed by the right part of line 17 in the code shown in Table 1. In step 404, it is determined if the pixel colour has finished, and a corresponding genPix signal generated accordingly. In other words, the genPix signal indicates that all of the input sample colours that contribute to a particular output sample have been processed, thereby confirming that the rgbaOut signal is valid. This function is performed by line 16 in the code shown in table 1. Preferably, the xOut signal and the genPix signal are merged in step 405 to produce the bundled output signal genPix/xOut 9. However, as mentioned above, these signals could be bundled in other ways, or provided separately to the processor.

In step 406, the first colour weight value w and the second colour weight value wN are determined. These functions are performed by lines 20, 21, 24 and 27 in the code shown in Table 1.

In step 407, the second colour weight value wN is weighted with the input sample colour received from the rgbaIn signal 5. The resultant weighted sample colour is added in step 408 to the accumulated weighted sample colours (ie the rgbaPartIn signal 7) to produce the rgbaPartOut signal 13. These functions are performed by line 25 in the code shown in Table 1.

In step 409, the first colour weight value w is weighted with the input sample colour received from the rgbaIn signal 5. The resultant weighted sample colour is added in step 410 to the accumulated weighted sample colours (ie the rgbaPartIn signal 7) and rounded to a lower precision format, such as RGBA8888, to produce an output colour signal rgbaOut 11. These functions are performed by line 28 in the code shown in Table 1.

From the above it can be seen that the digital image processor operates on input sample colour signals until the genPix signal indicates that pixel processing has been completed. At that point in time, the colour signal rgbaOut 11 is valid for the output sample coordinates shown by the xOut signal 9. Once completed, the same procedure is repeated for the next pixel of the digital image signal.

According to the invention described above, a digital image processing operation is provided for use in applications such as performing texture mapping in a 3D graphics pipeline.

Other advantages, implementations and subdivisions of the c-code are also possible. A somewhat finer granularity would be to partition the hardware in three parts according to the dashed lines in the flowchart of FIG. 4. The top part deals with the coordinates and producing the colour weight values w and wN. The other parts might be implemented using vectorized multiply/add operations. In that case the bottom-left part of FIG. 4 might be conditionally executed depending on the xOut value (e.g. using xOut as a guard of the separate "bottom-left" operation).

Another alternative for a processor that does not contain a 64 bit data path with 64 bit register filed would be to absorb the (single) register associated with the rgbaPartOut and rgbaPartIn connections, as shown in FIG. 2 mentioned above.

In filter terminology, the digital signal processing operation described above implements a 1D resampler using a transposed direct mode FIR filter structure having a box reconstruction filter and a box pre-filter (also known as anti-aliasing filter). The box reconstruction filter is provided to avoid DC-ripple. The digital signal processing operation has been devised to perform the texture mapping resampling function in a 3D graphics pipeline, but, as mentioned above, it can also be used for down scaling of video such as downscaling from the camera to a display in a mobile phone. Also the method can also be applied on resampling of non-image signals.

The present invention has the advantage over prior art techniques in that the resampling process is accelerated. Also, the operation of the present invention only implements a box prefilter (prefilter width is one), which avoids the need for a look-up table where the (integral of the) prefilter profile is stored. Furthermore, it is noted that two test conditions have been added to be performed within the structure of the resample operation. This way control code around this operation can be avoided. These two test conditions relate to preventing decreasing coordinates and magnification, as described in relation to lines 13 and 14 of the code in Table 1.

According to another aspect of the invention, the pseudo code shown in Table 2 below details how the digital signal processing operation can be used to implement 2D down-sampling of digital images (or other digital data). An input sample with colours rgbaIn is resampled (or splatted) to a group of output samples close to output pixel position (xr, yr). The samples of the input image to be minified is traversed and the splatbox2D function is called for every input sample. When an image has to be magnified by some arbitrary factor it is of course possible to use on-the-fly sample duplication such that splatbox2D still only has to deal with the minification case.

Table 2—Below

```
---globals---
uns16    xl;
uns16    yl [SCRWIDTH];
uns64    rgbaPartH;
uns64    rgbaPartV [SCRWIDTH];
void splatbox2D (fixP xr, fix yr, uns8 rgbaIn[4] )
{
    uns8        rgbaIm[4],      // output color of 1st pass (im =
intermediate)
                rgbaOut[4];     // filtered color at pixel position, for
display
    uns32       xlr;
    uns32       xOut, yOut;
    bool hGenPix, vGenPix;
    uns16 x, y;
    ----- 1st pass resampling -----
    xlr = join(xl, xr);
    Splatbox(xlr, rgbaIn, rgbaPartH, xOut, rgbaIm, rgbaPartH );
    HGenPix = xOut >> 16;
    x = (short)xOut;
    xl = xr;       // copy xr to xl for use in next iteration
    if (hGenPix) ----- 2nd pass resampling -----
    {
            uns32    ylr;
            ylr = join(yl[x], yr);
            splatbox(ylr, rgbaIm, rgbaPartV[x], yOut, rgbaOut,
rgbaPartV[x] );
            vGenPix = yOut >> 16;
            y = (short) yOut;
            yl[x] = yr;
    if (hGenPix && vGenPix) writePixelToScreen( x, y, rgbaOut, swapxy,
flipy);
    }
}
```

In the code shown in Table 2 above, the second pass (eg Vertical) is interleaved with the first pass (eg horizontal). To enable this the rgbaPartIn/Out of the second (interleaved) pass is stored in an array.

The invention described above provides more efficient processing of a digital image signal, i.e. less cycles (for example cycles/pixel) are required to process the executable program using the image processing operation compared to an executable program that uses smaller (finer granularity) operations to implement the image processing.

Although the preferred embodiment has been described as having three separate logic units, it will be appreciated that this has been done for illustrative purposes only, and that the three separate logic units could equally be viewed as a single logic unit, or subdivided in different ways.

Also, although the preferred embodiment has been described in relation to processing a digital image signal, it will be appreciated that the invention could also be used for processing any digital signal. Likewise, although the preferred embodiment has been described in relation to using colour weight values, these may be weight values relating to any parameter, ie other than colour.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A programmable processor for processing one or more input sample values of a digital signal to produce an output signal, the processor comprising:
   a first logic unit adapted to generate first and second weight values;
   a second logic unit adapted to receive an input sample value and the second weight value, and to weight the input sample value with the second weight value to produce a weighted sample value, and further adapted to add the weighted sample value to one or more previously generated weighted sample values to generate an accumulated weighted sample value;
   a third logic unit adapted to receive the input sample value and the first weight value, and to generate an output sample based on the input sample value, the first weight value and the accumulated weighted sample value output from the second logic unit.

2. A processor as claimed in claim 1, wherein the first logic unit comprises:
   means for receiving a first coordinate signal and a second coordinate signal relating to current and previous sample values, respectively; and
   means for generating the first and second weight values based on the first and second coordinate signals.

3. A processor as claimed in claim 2, wherein the first logic unit further comprises means for increasing the values of the first coordinate signal and the second coordinate signal (xl) by a predetermined value prior to generating the first and second weight values.

4. A processor as claimed in claim 2, wherein the first logic unit further comprises means for producing an output coordinate signal for the output sample.

5. A processor as claimed in claim 4, whereby the means for producing the output coordinate signal is adapted to derive the output coordinate signal from an integer part of the second coordinate signal.

6. A processor as claimed in claim 1, wherein the first logic unit further comprises means for generating a status signal for indicating when the output sample and output coordinate signal are valid.

7. A processor as claimed in claim 1, wherein the first logic unit further comprises means for preventing decreasing coordinates.

8. A processor as claimed in claim 1, wherein the first logic unit further comprises means for preventing magnification.

9. A processor as claimed in claim 1, wherein the second logic unit comprises:
   means for receiving the input sample value that contributes to the output sample value;
   means for weighting the input sample value with the second weight value to produce a weighted sample value;
   means for adding the weighted sample value to an accumulated weighted sample value from a previous iteration, the result forming the accumulated weighted sample value.

10. A processor as claimed in claim 1, wherein the third logic unit comprises:
    means for receiving the input sample value that contributes to the output sample value;
    means for weighting the input sample value with the first weight value (w) to produce a weighted sample value;
    means for adding the weighted sample value to an accumulated weighted sample value from a previous iteration, the result forming the output sample.

11. A processor as claimed in claim 1, wherein the accumulated weighted sample value is stored in a register file of a corresponding processor.

12. A processor as claimed in claim 1, wherein an input sample value relates to an input sample color of an image signal, and wherein a weight value relates to a color weight value.

13. A processor as claimed in claim 12, wherein the processor is configured to perform a two dimensional image signal resampling operation.

14. A processor as claimed in claim 1, wherein one or more of the logic units are combined into a single operational unit.

15. A processor as claimed in claim 14, wherein a register storing the accumulated weighted sample value forms part of the single operational unit.

16. A processor as claimed in claim 1, wherein one or more of the logic units form several operational units.

17. A method of performing a digital signal processing operation in which one or more input sample values of a digital signal are processed to produce an output signal, the method comprising the steps of:
    generating by a processor first and second weight values;
    weighting by a processor an input sample value with the second weight value to produce a weighted sample value, and adding the weighted sample value to one or more previously generated weighted sample values to generate an accumulated weighted sample value; and
    generating by a processor an output sample based on the input sample value, the first weight value (w) and the accumulated weighted sample value.

18. A method as claimed in claim 17, wherein the step of generating the first and second weight values comprises the steps of:
    receiving by a processor a first coordinate signal and a second coordinate signal relating to current and previous samples, respectively; and
    generating by a processor the first and second weight values based on the first and second coordinate signals.

19. A method as claimed in claim 18, wherein the step of generating the first and second weight values further comprises the step of increasing by a processor the values of the first coordinate signal (xr) and the second coordinate signal by a predetermined value prior to generating the first and second weight values.

20. A method as claimed in claim 18, further comprising the step of producing by a processor an output coordinate signal for the output sample.

21. A method as claimed in claim 20, wherein the step of producing the output coordinate signal involves deriving by a processor the output coordinate signal from an integer part of the second coordinate signal.

22. A method as claimed in claim 17, further comprising the step of generating by a processor a status signal for indicating when the output sample and output coordinate signal are valid.

23. A method as claimed in claim 17, further comprising the step of preventing decreasing coordinates by a processor.

24. A method as claimed in claim 17, further comprising the step of preventing magnification by a processor.

25. A method as claimed in claim 17, wherein the step of generating an accumulated weight sample value comprises the steps of:
  receiving by a processor the input sample value that contributes to the output sample;
  weighting by a processor the input sample value with the second weight value to produce a weighted sample value;
  adding by a processor the weighted sample value to an accumulated weighted sample value from a previous iteration, the result forming the accumulated weighted sample value.

26. A method as claimed in claim 17, wherein the step of generating the output sample comprises the steps of:
  receiving by a processor the input sample value that contributes to the output sample;
  weighting by a processor the input sample value with the first weight value (w) to produce a weighted sample value;
  adding by a processor the weighted sample value to an accumulated weighted sample value from a previous iteration, the result forming the output sample.

27. A method as claimed in claim 17, further comprising the step of storing by a processor the accumulated weighted sample value in a register file of a corresponding processor.

28. A method as claimed in 17, wherein an input sample value relates to an input sample color of an image signal, and wherein a weight value relates to a color weight value.

29. A method as claimed in claim 28, wherein the method steps form a two dimensional image signal resampling operation by a processor.

30. A method as claimed in claim 17, wherein one or more of the steps are combined into a single operation by a processor.

31. A method as claimed in claim 17, wherein one or more of the steps are combined into several operations by a processor.

* * * * *